Sept. 3, 1968    L. C. MEYNELL    3,399,831
VALVE FOR CONTROLLING THE MIXING OF HOT AND COLD FLUIDS
Filed Oct. 10, 1966    2 Sheets-Sheet 1
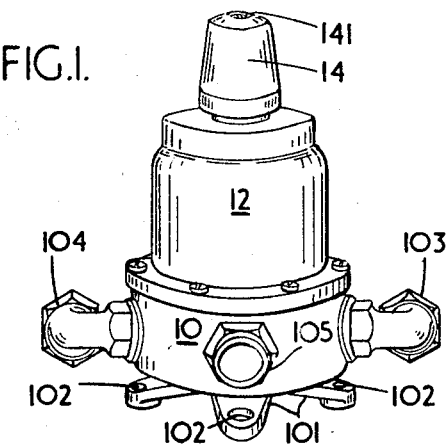
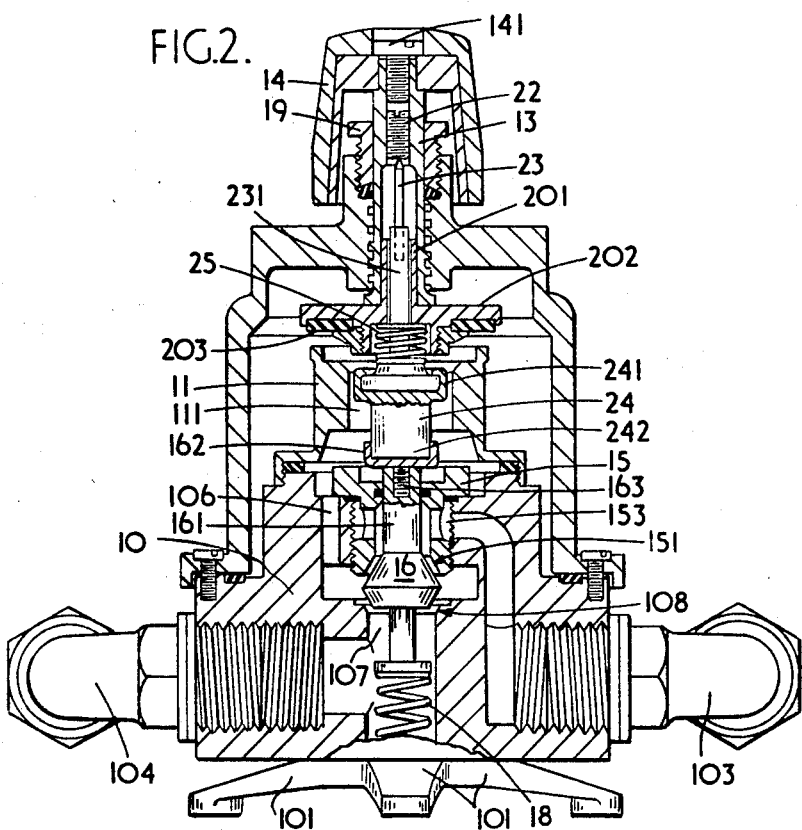

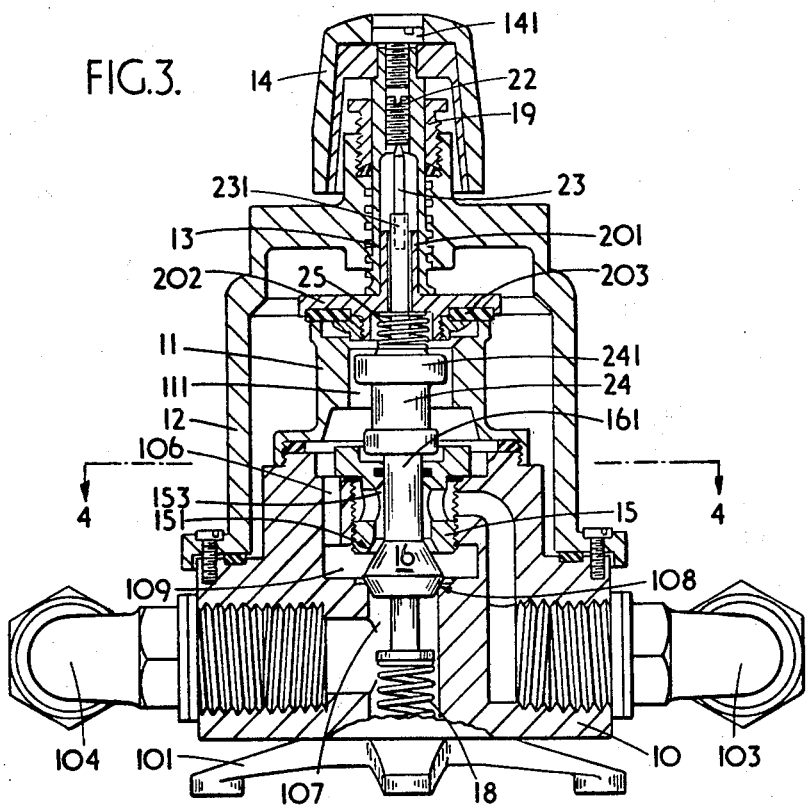
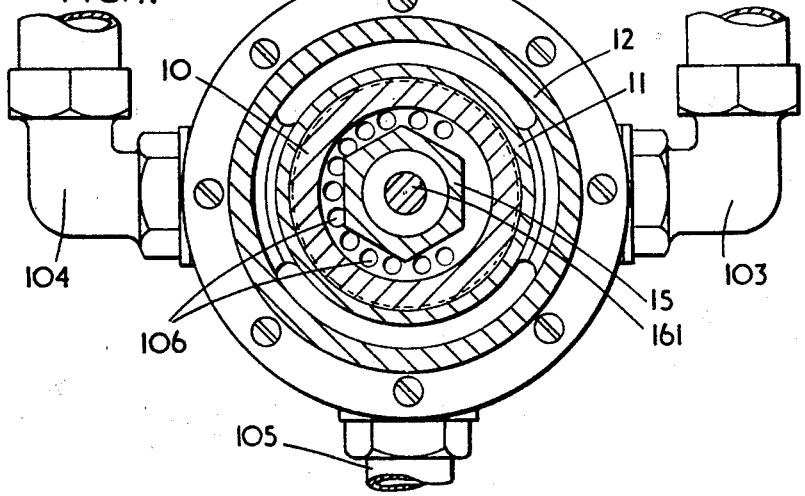

United States Patent Office 3,399,831
Patented Sept. 3, 1968

3,399,831
VALVE FOR CONTROLLING THE MIXING OF HOT AND COLD FLUIDS
Lionel Charles Meynell, Wolverhampton, England, assignor to Meynell & Sons Limited, Wolverhampton, England
Filed Oct. 10, 1966, Ser. No. 585,380
Claims priority, application Great Britain, Nov. 9, 1965, 47,391/65
2 Claims. (Cl. 236—12)

ABSTRACT OF THE DISCLOSURE

The invention pertains to a mixing valve for hot and cold fluids and includes a conical valve with axially opposed seats which seat on conical valve seats thereby controlling the admission of hot and cold fluids from respective hot and cold inlet lines. Downstream of the valve seats is a heat sensitive device located in a mixing chamber. The heat sensitive device is connected at one end to the valve and at the other end to a manually settable spring biased temperature control handwheel. The valve is so arranged that cold fluid is discharged upon first opening the valve so as to prevent scalding when the valve is used for controlling water flow to such household devices as showers.

BACKGROUND

A valve for controlling the mixing of hot and cold fluids especially valves for controlling the mixing of hot and cold water for domestic and industrial purposes are known in which thermostatic means is provided for ensuring that after manipulation of a settable means mixed liquid will continue to be dispensed at a predetermined temperature and in which the sensitive thermostatic means cooperates with valve means which ensure that when the settable means is open initially cold water only will flow from the outlet for the mixed fluid for the avoidance of inadvertent scalding.

OBJECTIVE

The present invention has for its object to provide a valve for controlling the mixing of hot and cold fluids especially for controlling the mixing of hot and cold water for domestic and industrial purposes which provides that the discharge of cold fluid must always precede the discharge of heated fluid and which valve means is considered to be simpler in construction and more efficient in operation than valves for controlling the mixing of hot and cold fluids suggested heretofore.

The invention corresponds to that disclosed and claimed in the pending British patent application No. 47,391 filed Nov. 9, 1965, and priority as of that date is claimed for the present application.

DESCRIPTION

An embodiment of the invention will now be described with particular reference to the accompanying drawings which illustrate the invention as applied to a valve for controlling the mixing of hot and cold fluids which in general is somewhat similar to the mixing valve disclosed in our British patent specification No. 969,925 and in our prior U.S. patent specification No. 2,977,989.

In the drawings—

FIGURE 1 is a perspective view of a mixing valve in accordance with the invention.

FIGURE 2 is a vertical section on an enlarged scale of the mixing valve illustrated in FIGURE 1 with the component parts in the positions occupied when the valve is in the open position.

FIGURE 3 is a view generally similar to FIGURE 2 but with the component parts in the positions occupied when the valve is in the closed position.

FIGURE 4 is a cross section taken on the plane indicated by the line 4—4 in FIGURE 3 looking in the direction of the arrows to the said line.

In the drawings like numerals of reference indicate similar parts in the several views.

For convenience in the following description the parts will be referred to as though the valve was occuping a vertical position as shown in the aforesaid drawings, although in practice the valve is more frequently mounted in other manners.

According to the said illustrated embodiment of the invention the mixing valve incorporates a base section 10 adapted to be fitted to a wall or other fixture by means of a spider 101 the arms of which are provided with holes 102 for the passage of the fixing screws. The said base section 10 is provided at one side with an inlet 103 for cold fluid and at the diametrically opposite position with an inlet 104 for hot fluid and at an intermediate position with an outlet 105 for the discharge of mixed fluids at the predetermined temperature.

As in our prior British patent specification No. 969,925 the fluids after mixing are permitted to pass through vertical channels 106 into a space 111 bounded by an upstanding cylindrical baffle 11.

The base section 10 aforesaid has bolted thereto a hollow domed cover 12 which is provided at the centre of the closed end with bearings 121 for a tubular spindle 13 on the upper and outer projecting end of which is nonrotatably fixed in a manner to be described hereinafter a capstan or other operating head 14. The base section 10 aforesaid is provided also with a centrally disposed annular passage 107 which terminates at its upper end in a frusto-conical valve seating 108 which is oppositely disposed relatively to a frusto-conical valve seating 151 formed in a screw plug screwed into the centre of the base section 10 as in our prior U.S. patent specification No. 2,977,989. The said oppositely disposed frusto-conical valve seatings 108, 151 co-operate with the complementary surfaces of a co-axial duplex cone valve 16 hereinafter referred to as the duplex cone valve 16, also as in our said prior U.S. patent specification No. 2,977,989.

The duplex cone valve 16 is provided with an upstanding stem 161 which is axially disposed within and slidable within a bearing in the plug 15 aforesaid. This plug 15 is provided with an annular chamber 153 which is continuously in communication with the inlet 103 for the cold fluid and when so permitted by way of a space intervening between the seating 151 for the upper section of the duplex cone valve 16 with the annular chamber 109 and thence by way of the vertical passages 106 which open into the interior 111 of the upstanding cylindrical baffle 11 aforesaid. The lower portion of the base section 10 is provided with a centrally disposed vertical cylindrical recess within which is located a spring 18, hereinafter termed the return spring 18, which acts on the lower end of the duplex cone valve 16 and tends to urge the said duplex cone valve 16 upwardly.

The hot water inlet 104 is open to the vertical passage 107 in the base section 10 which is concentric with the axis of movement of the duplex cone valve 16 and which terminates at its upper end in the lower seating 108 for the duplex cone valve 16, that is the seating in conjunction with the lower portion of the duplex cone valve 16 which controls the supply of hot water the arrangement being such that when the lower portion of the duplex cone valve 16 is lifted from its seating 108 hot water may pass by way of the space intervening between the said seating 108 and the curved surface of the lower portion of the duplex cone valve 16 into the common annular chamber 109 which opens by way of the vertical passage 106 aforesaid into the interior 111 of the upstanding cylindrical baffle 11.

The upper portion of the tubular operating spindle 13 aforesaid projects from the cover 12 and has the manipulating head 14 fixed non-rotatably on a 'squared' portion thereof by screw means 141 to be referred to again hereinafter.

The tubular operating spindle 13 is provided with an intermediate portion which passes through and is sealed by a gland nut 19 in accordance with conventional practice. The screw thread for the tubular spindle 13 is of coarse pitch so as to provide for a quick opening and closing of the valve as may be required.

The bore of the lower end of the tubular spindle 13 serves to accommodate an upstanding hollow cylindrical element 201 to the lower end of which is fixed a circular plate 202 hereinafter termed the closure plate 202, the undersurface of which carries an annular sealing ring 203 which is adapted when required to be moved onto the upper end of the upstanding cylindrical baffle 11 to provide a positive and complete cut-off of water which otherwise could pass from the interior of the baffle 11 into the annular space 122 surrounding the baffle 11 and thence to the discharge outlet 105 in a similar manner to that described in our prior British patent specification No. 969,925 as will be referred to hereinafter.

The screw 141 which secures the operating head 14 on the 'squared' end of the tubular spindle 13 may be removed to give access to an adjusting screw 22 having a fine pitch thread which is adjustably mounted in the tapped bore of the tubular spindle 13 as in our said British patent specification No. 969,925. This adjusting screw 22 co-operates with the projecting upper end of a peg 23 the lower portion of which is seated within a concentric sleeve 231 which is secured at its lower end to the top cap 241 of an expansible temperature responsive unit 24 of a known type.

Arranged concentrically around the lower portion of the sleeve 231 is a coil spring 25 the upper end of which is adapted to thrust on the closure plate 202 whilst the lower end thrusts on the top cap 241 of the temperature responsive unit 24.

The said spring 25, hereinafter termed the hot water opening delay spring 25, is stronger than the return spring 18.

It should be pointed out that the space intermediate the underside of the closure plate 202 and the top cap 241 of the temperature responsive unit 24 provides for a degree of lost motion between the temperature responsive unit 24 and the peg 23 associated with the adjusting screw 22 as and for a purpose to be described hereinafter.

The bottom cap 242 of the temperature responsive unit 24 is seated within a cup 162 having a depending stem 163 which is screwed into a tapped hole in the upper end of the stem 161.

Preparatory to use the screw 141 fixing the operating head 14 to the tubular operating spindle 13 is removed and the temperature adjusting screw 22 adjusted to limit the degree of lift permitted to the duplex cone valve 16 so that a predetermined maximum temperature cannot be exceeded, the said adjusting screw 22 operating in an analogous manner to that described in our prior British patent specification No. 969,925.

The operating head 14 is then refitted on the 'squared' portion of the tubular operating spindle 13 and secured thereto by the screw 141 whereupon the operating head 14 is rotated to correspond to a position known to afford a discharge of mixed fluid at a predetermined temperature as may be decided, for example by the registry of an index on the operating head 14 with a graduated scale (not shown) on the upper end of the cover 12.

In the initial position the strength of the hot water opening delay spring 25 is such that the upward force exerted by the return spring 18 is nullified and the lower portion of the common duplex cone valve 16 is caused to be forced onto its seating 107 by the stronger hot water opening delay spring 25 so as to seal off the hot water inlet 104.

Concurrently the movement imparted to the duplex cone valve 16 moves the upper section of the duplex cone valve away from its seating 151 so that cold water can pass by way of the space intervening between the periphery of the upper section of the said duplex cone valve 16 and its complementary seating 151 into the common annular chamber 109 and thence by way of vertical passages 106 into the interior 111 of the upstanding cylindrical baffle 11.

Continued rotation of the manipulating head 14 results in the greater force exerted by the hot water opening delay spring 25 becoming counteracted by the return spring 18 so that the said return spring 18 urges the duplex cone valve 16 upwardly to cause the periphery of the lower section of the duplex cone valve 16 to move away from its seating 107 so that hot water can pass into the common annular chamber 109 by way of the space intervening between the periphery of the lower portion of the duplex cone valve 16 and the lower seating 107. Thus hot and cold water may now flow into the interior of the baffle 11 and after mixing be discharged from the space 112 surrounding the baffle 11 by way of ports 10a in the base section 10 and the outlet 105.

In the event of the temperature of the mixed fluids exceeding the desired predetermined temperature the temperature responsive unit 24 comes into operation to cause the peg 23 to move into abutment with the temperature adjusting screw 22 so that further opening of the duplex cone valve 16 is prevented, the said upward movement by the temperature responsive unit 24 being permitted by reason of the permissible lost motion between the upper end of the cap 241 and the closure plate 202.

The operation of the temperature responsive unit 24 is such as to actuate the duplex cone valve 16 to permit the hot and cold fluids to enter the mixing chamber 109 in proportions which will result in the discharge from the outlet 105 of fluid at the desired predetermined temperature.

When it is desired to cut off the discharge of mixed fluid the manipulating head 14 is screwed down until the annular sealing washer 203 seats on the upper end of the baffle 11 and effects a positive sealing of the interior of the baffle 11 thus dispensing with the necessity for an auxiliary cut-off valve as was employed in the case of the mixing valve described and illustrated in our prior British patent specification No. 969,925.

It will be appreciated that a mixing valve in accordance with the invention minimises the possibility of scalding due to tampering with the valve by reason of the concealed temperature adjusting screw 22 aforesaid as in the case of the mixing valve disclosed in our prior British patent specification No. 969,925.

Furthermore, scalding on the initial opening of the valve 16 is prevented, since it is ensured that cold water only may be discharged on the initial manipulation of the operating head 14.

I claim:

1. A valve for controlling the mixing of hot and cold fluids incorporating in combination an inlet for the cold fluid, an inlet for the hot fluid, an outlet for the mixed fluids, a conical valve seating opening into the inlet for the cold fluid, an oppositely disposed conical valve seating opening into the inlet for the hot fluid, a mixing chamber which can communicate with both the cold and hot fluid inlets, a common rigid positively acting valve means of duplex conical formation, one conical face of which coacts with the conical seating opening into the cold fluid inlet whilst the opposite conical face coacts with the conical seating opening into the inlet for the hot fluid opening, said faces and seatings controlling opening and closing of the hot and cold fluid inlets, settable means for determining the degree of opening to be permitted to the said common duplex valve means and which ensures that on initial manipulation of the said settable means the said common duplex valve is caused to move off the conical seating for the cold fluid inlet whilst the opposite conical face remains seated on the conical seating opening into the hot fluid inlet so that the supply of hot fluid is cut off, said settable means on continued opening permitting the said common duplex valve means to open the hot inlet whilst allowing the cold fluid inlet to remain open, and heat sensitive means coupled positively to the said common duplex valve means so that after setting the settable means to an opening position corresponding to the desired temperature to be given to the mixed fluid the said common duplex valve means will fluctuate between the cold fluid inlet and hot fluid inlet opening positions to ensure that the mixed fluids delivered from each inlet mix in the mixing chamber aforesaid to provide on discharge at the outlet a mixed fluid of predetermined temperature as desired by the setting given to the said settable means, and closure valve means which closes on to the outlet from the mixing chamber to cut off all communication with the outlet when the settable means is closed to the zero position, spring means acting directly on the common duplex valve means tending to move the said common duplex valve means into the opening position for the hot fluid inlet and an oppositely disposed stronger spring means acting directly through the heat sensitive means tending to close the common duplex valve means on to the seating for the hot fluid inlet so that on initial opening the stronger spring tends to move the common duplex valve means into the open position for the cold fluid inlet so that cold fluid only is first discharged, and settable means for limiting movement available to the heat sensitive means on increase of temperature so that a maximum discharge temperature for mixed fluids cannot be exceeded.

2. A valve for controlling the mixing of hot and cold fluids as claimed in claim 1 in which lost motion is provided between the heat sensitive means and the closure valve.

References Cited

UNITED STATES PATENTS

| | | | |
|---|---|---|---|
| 2,141,520 | 12/1938 | Dube | 236—12 |
| 2,475,540 | 7/1949 | Birchfield | 236—12 |
| 2,997,239 | 8/1961 | Priesmeyer | 236—12 |
| 3,152,760 | 10/1964 | Bowman | 236—12 |
| 3,228,603 | 1/1966 | Norman | 236—12 |

ROBERT A. O'LEARY, *Primary Examiner.*

W. E. WAYNER, *Assistant Examiner.*